United States Patent
Selén et al.

(10) Patent No.: US 9,258,837 B2
(45) Date of Patent: Feb. 9, 2016

(54) DISCOVERY IN DEVICE-TO-DEVICE COMMUNICATION

(75) Inventors: Yngve Selén, Uppsala (SE); Stefan Parkvall, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/427,360

(22) PCT Filed: Sep. 13, 2012

(86) PCT No.: PCT/SE2012/050967
§ 371 (c)(1),
(2), (4) Date: Mar. 11, 2015

(87) PCT Pub. No.: WO2014/042566
PCT Pub. Date: Mar. 20, 2014

(65) Prior Publication Data
US 2015/0250010 A1   Sep. 3, 2015

(51) Int. Cl.
*H04W 4/00* (2009.01)
*H04W 76/02* (2009.01)
*H04L 29/08* (2006.01)
*H04W 56/00* (2009.01)
*H04W 4/06* (2009.01)
*H04W 4/20* (2009.01)

(52) U.S. Cl.
CPC ............ *H04W 76/023* (2013.01); *H04L 67/16* (2013.01); *H04L 67/325* (2013.01); *H04W 4/005* (2013.01); *H04W 4/008* (2013.01); *H04W 56/001* (2013.01); *H04W 4/06* (2013.01); *H04W 4/206* (2013.01)

(58) Field of Classification Search
CPC . H04W 76/023; H04W 67/16; H04W 67/325; H04W 4/005; H04W 4/008; H04W 56/001; H04W 4/06; H04W 4/206
See application file for complete search history.

(56) References Cited

U.S. PATENT DOCUMENTS

| | | | |
|---|---|---|---|
| 8,447,284 B1* | 5/2013 | Lee | H04W 4/06 455/3.01 |
| 2003/0140088 A1* | 7/2003 | Robinson | G06Q 10/10 709/202 |
| 2005/0186973 A1* | 8/2005 | Gaal | H04W 48/12 455/458 |
| 2006/0274780 A1 | 12/2006 | Walsh et al. | |
| 2009/0028081 A1* | 1/2009 | Song | H04W 4/06 370/310 |
| 2011/0153773 A1 | 6/2011 | Vandwalle et al. | |
| 2011/0258313 A1 | 10/2011 | Mallik et al. | |
| 2014/0089492 A1* | 3/2014 | Nelson | H04L 67/325 709/224 |

FOREIGN PATENT DOCUMENTS

EP   1 022 876 A1   7/2000

OTHER PUBLICATIONS

International Search Report, PCT Application No. PCT/SE2012/050967, Jun. 6, 2013.
Written Opinion of the International Searching Authority, PCT Application No. PCT/SE2012/050967, Jun. 6, 2013.
Corson et al., "Toward Proximity-Aware Internetworking", *IEEE Wireless Communications*, Dec. 2010, pp. 26-33.

* cited by examiner

*Primary Examiner* — Pakee Fang
(74) *Attorney, Agent, or Firm* — Myers Bigel Sibley & Sajovec, P.A.

(57) ABSTRACT

A method in a base station comprising a memory storing one or more service types and a radio interface that communicates with a device. The method includes arranging a service scheduling by assigning at least one time slot to a service type and transmitting information on said service scheduling to a device.

6 Claims, 5 Drawing Sheets

SERVICE1:1; SERVICE4:1; SERVICE3; SERVICE1:2; SERVICE2; SERVICE4:2

Fig. 6A  600

| SERVICE1 | SERVICE2 | SERVICE3 | SERVICE4 |

Fig. 6B  610  600

| SERVICE1:1 | SERVICE2 | SERVICE3 | SERVICE4:1 |

600

...

| SERVICE1:2 | SERVICE2 | SERVICE3 | SERVICE4:2 |

Fig. 6C  600

| SERVICE1:1; SERVICE1:2 | SERVICE2 | SERVICE3 | SERVICE4:1; SERVICE4:2 |

Fig. 6D  610  600

| SERVICE1 | SERVICE2 | SERVICE3 | SERVICE4 |

Fig. 6E  610  600

DISCOVERY IN DEVICE-TO-DEVICE COMMUNICATION

CROSS REFERENCE TO RELATED APPLICATION

This application is a 35 U.S.C. §371 national stage application of PCT International Application No. PCT/SE2012/050967, filed on Sep. 13, 2012, the disclosure and content of which is incorporated by reference herein in its entirety. The above-referenced PCT International Application was published in the English language as International Publication No. WO 2014/042566 A1 on Mar. 20, 2014.

TECHNICAL FIELD

This application relates to methods, devices, a base station and a computer-readable storage medium for improved transmittal and reception of service data.

BACKGROUND

In communication systems where devices, such as mobile phones, communicate directly with each other, so-called Device-to-Device communication systems, it is beneficial if the services running on the devices, that are enabled for such communication, can present themselves to services running on other devices, so that the services may pair up by means of direct communication between the devices for sharing data and content, without burdening a base station operating a cell where the devices are currently in.

In prior art systems this has been solved by allowing the devices to transmit an identification relating to a service that the other, or remote, devices can intercept and thereby identify which services are offered by the device.

The identification is broadcasted over a (dedicated) channel and a device or service running on the device that is trying to discover services running on remote devices simply listens to the channel and as the service sought for is detected the device can, if desired, initiate a connection with the remote device for sharing data and/or content, depending on the service type.

The prior art systems suffer from the drawback that the device is required to listen to all traffic over the channel which draws power and is time consuming.

There is thus a need for an improved manner of enabling a device to discover a service running on a remote device and also to enable a remote device to discover services running on the device.

SUMMARY

It is an object of the teachings of this application to overcome the problems listed above by providing a method for use in a device comprising a memory, a controller configured for execution of one or more services, and a radio interface for communicating with a remote device, said method comprising listening according to a service scheduling to a channel via said radio interface for discovering one or more services running on said remote device by receiving data associated with one or more of said one or more services, wherein said service scheduling is arranged according to at least one service type.

In one embodiment the data associated with one or more of said one or more services comprises an expression which in turn comprises the service type and an identification of the one or more service.

It is a further object of the teachings of this application to overcome the problems listed above by providing a method for use in a device comprising a memory configured to store one or more services and data associated with said one or more services and a radio interface for communicating with a remote device, said method comprising transmitting data associated with one or more of said one or more services according to a service scheduling over a channel via said radio interface to enable said remote device to discover said one or more services running on said device, wherein said service scheduling is arranged according to at least one service type.

It is a further object of the teachings of this application to overcome the problems listed above by providing a method for use in a base station comprising a memory configured to store one or more service types and a radio interface for communicating with a device, said method comprising arranging a service scheduling by assigning at least one time slot to a service type and transmitting information on said service scheduling to a device.

In one embodiment the service scheduling is arranged by assigning at least one (partial) time slot to a service type.

This enables a device implementing a method as above to discover services, and have its own services be discovered, without being required to listen continuously to a channel on which identifications are transmitted. The device is thereby able to save battery power, and also free up processor clock cycles.

The manner taught herein is especially beneficial in that it does not require additional resources such as additional channels. The manner taught herein takes use of the resources already available and utilizes them to the fullest by structuring the service announcements in one channel, especially so when adapting the service scheduling dynamically to account for changes in for example data traffic and the number of available services. Also, to require that a device is to listen to and/or transmit on several channels (such as different code domain channels or different frequency domain channels) or at different frequencies simultaneously adds to the complexity and the power consumption of the device.

It is a further object of the teachings of this application to overcome the problems listed above by providing a device comprising a memory, a controller configured for execution of one or more services, and a radio interface for communicating with a remote device, wherein said controller is further configured to listen to a channel via said radio interface for discovering said one or more services running on said remote device and/or for receiving service data associated with said one or more services, wherein said controller is configured to listen to said channel according to a service scheduling.

It is a further object of the teachings of this application to overcome the problems listed above by providing a device comprising a memory configured to store one or more services and data associated with said one or more services, a radio interface for communicating with a remote device, and a controller configured to enable a remote device to discover said services running on said device, and/or to transmit service data by transmitting data associated with one or more of said one or more services over a channel via said radio interface, wherein said controller is configured to transmit said service data on said channel according to a service scheduling.

In one embodiment the device is a mobile communications device, such as a mobile phone or laptop enabled for radio frequency communication.

It is a further object of the teachings of this application to overcome the problems listed above by providing a network node, such as a base station comprising a memory configured to store one or more service types, a radio interface for communicating with a device, and a controller configured to arrange a service scheduling by assigning at least one time slot to a service type and transmit information on said service scheduling to a device. In one embodiment the service scheduling is arranged by another network entity and transmitted to the base station for further distribution. In one such embodiment the service scheduling is arranged by a service provider or server executing a (partial) service.

It is a further object of the teachings of this application to overcome the problems listed above by providing a computer readable medium comprising instructions that when loaded into and executed by a controller, such as a processor, cause the execution of a method according to herein.

The inventors of the present application have realized, after inventive and insightful reasoning, that by sorting the available services into service types, the identification traffic that is to be transmitted can be ordered and, further, by assigning time slots to each service type, the device will know when to listen depending on the needs and requirements of the device, the services running on the device, or a user of the device.

Other features and advantages of the disclosed embodiments will appear from the attached detailed disclosure.

BRIEF DESCRIPTION OF DRAWINGS

The invention will be described in further detail under reference to the accompanying drawings in which:

FIG. 6A shows a schematic time view of transmitted expressions in a channel according to prior art;

FIGS. 6B, 6C, 6D and 6E each shows a schematic time view of the available time arranged in timeslots for transmitted expressions in a channel according to each an embodiment or a combination of embodiments of the teachings herein;

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
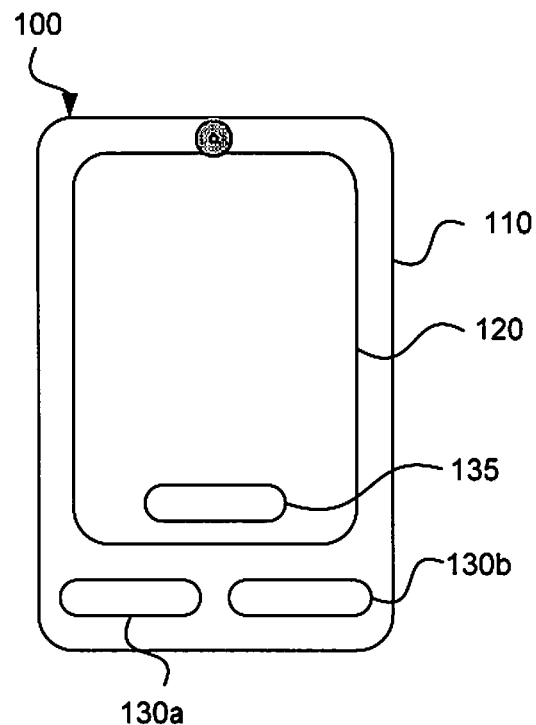
FIG. 1 shows a schematic view of a device according to one embodiment of the teachings of this application.

FIG. 1 shows a schematic overview of a device 100 adapted according to the teachings herein. In the embodiment shown the device is a mobile communications device and in this specific example it is a mobile phone 100. In other embodiments the device 100 is a personal digital assistant, a media player, a location finding device or any hand-held device capable of communicating with other devices. In one embodiment the device is a sensor, a vehicle device or a household appliance. The mobile phone 100 comprises a housing 110 in which a display 120 is arranged. In one embodiment the display 120 is a non-touch display. In other embodiments the display 120 is a touch display. Furthermore, the mobile phone 100 comprises two hard-wired keys 130a and 130b. In this embodiment there are two softkeys 130a and 130b, but any number of keys, including none, is possible and depends on the design of the mobile phone 100. In one embodiment the mobile phone 100 is configured to display and operate a virtual key 135 on the touch display 120. It should be noted that the number of virtual keys 135 are dependent on the design of the mobile phone 100 and an application that is executed on the mobile phone 100. In one embodiment the communications terminal 100 comprises an ITU-T keypad or a QWERTY (or equivalent) keypad in addition to or as an alternative to a touch-sensitive display. In an embodiment where the keypad is an alternative to a touch-sensitive display, the display 120 is a non-touch-sensitive display.

Figure 2:
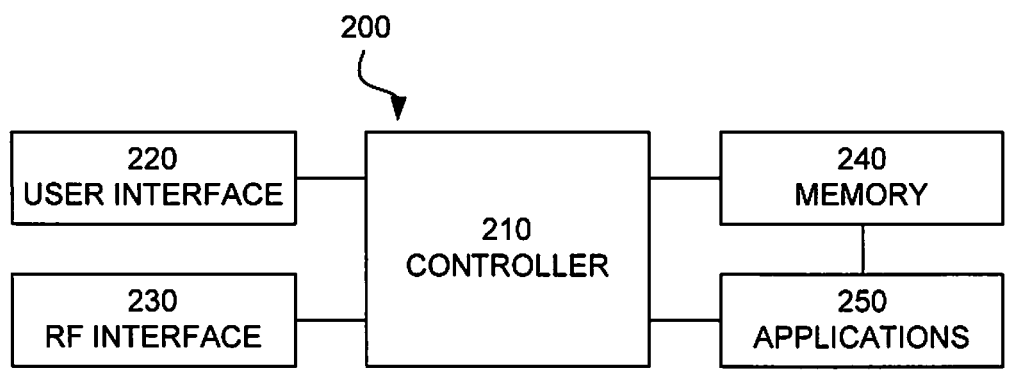
FIG. 2 shows a schematic view of the general structure of a device according to one embodiment of the teachings of this application.

FIG. 2 shows a schematic view of the general structure of a device which may be a mobile communications device, such as a mobile phone 100 according to FIG. 1. The device 200 comprises a controller 210 which is responsible for the overall operation of the device and is preferably implemented by any commercially available CPU ("Central Processing Unit"), DSP ("digital signal processor") or any other electronic programmable logic device, or a combination of such processors and/or other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the device 200. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof. The memory 240 is used for various purposes by the controller 210, one of them being for storing application data and various software modules in the device.

The software modules include a real-time operating system, drivers for a user-machine interface, an application handler as well as various applications 250. The applications 250 are sets of instructions that when executed by the controller 210 control the operation of the device 200. The applications 250 can include a messaging application for short messaging service (SMS), multimedia messaging service (MMS) and electronic mail, a media player application, as well as various other applications 250, such as applications for voice calling, video calling, web browsing, document reading and/or document editing, an instant messaging application, a phonebook application, a calendar application, a control panel application, one or more video games, a notepad application, location finding applications, etc.

The applications 250 also include applications for one or more services. The services may relate to social media (such as Facebook™), commercial services (such as announcements from restaurants or shops), transportation services (such as timetables and/or traffic updates for trains, buses etc), office services or location—specific applications to name a few.

The device 200 further comprises a user interface 220, which in the mobile phone 100 of FIG. 1 is comprised of the display 120, the keys 130, 135, a microphone and a loudspeaker. The user interface (UI) 220 also includes one or more hardware controllers, which together with the user interface drivers cooperate with the display 120, keypad 130, as well as various other I/O devices such as vibrator, ringtone generator, LED indicator, etc. As is commonly known, the user may operate the device through the man-machine interface thus formed.

The device 200 may further comprise a radio frequency interface 230, which is adapted to allow the device to communicate with other communications terminals in a radio frequency band through the use of different radio frequency technologies. Examples of such technologies are W-CDMA, GSM, UTRAN, LTE and NMT to name a few. The controller 210 is configured to operably execute the applications 250, such as the voice call and message handling applications, through the RF interface 230 and software stored in the memory 240. The software includes various modules, protocol stacks, drivers, etc. to provide communication services (such as transport, network and connectivity) for the RF interface 230, and optionally a Bluetooth interface, an IEEE 802.11 standard interface (WiFi) and/or an IrDA interface for short range, local connectivity. The RF interface 230 comprises an internal or external antenna as well as appropriate radio circuitry for establishing and maintaining a wireless link to a base station. As is well known to a person skilled in the art, the radio circuitry comprises a series of analogue and digital electronic components, together forming a radio receiver and transmitter. These components include, for example, band pass filters, amplifiers, mixers, local oscillators, low pass filters, AD/DA converters, etc.

Figure 3:
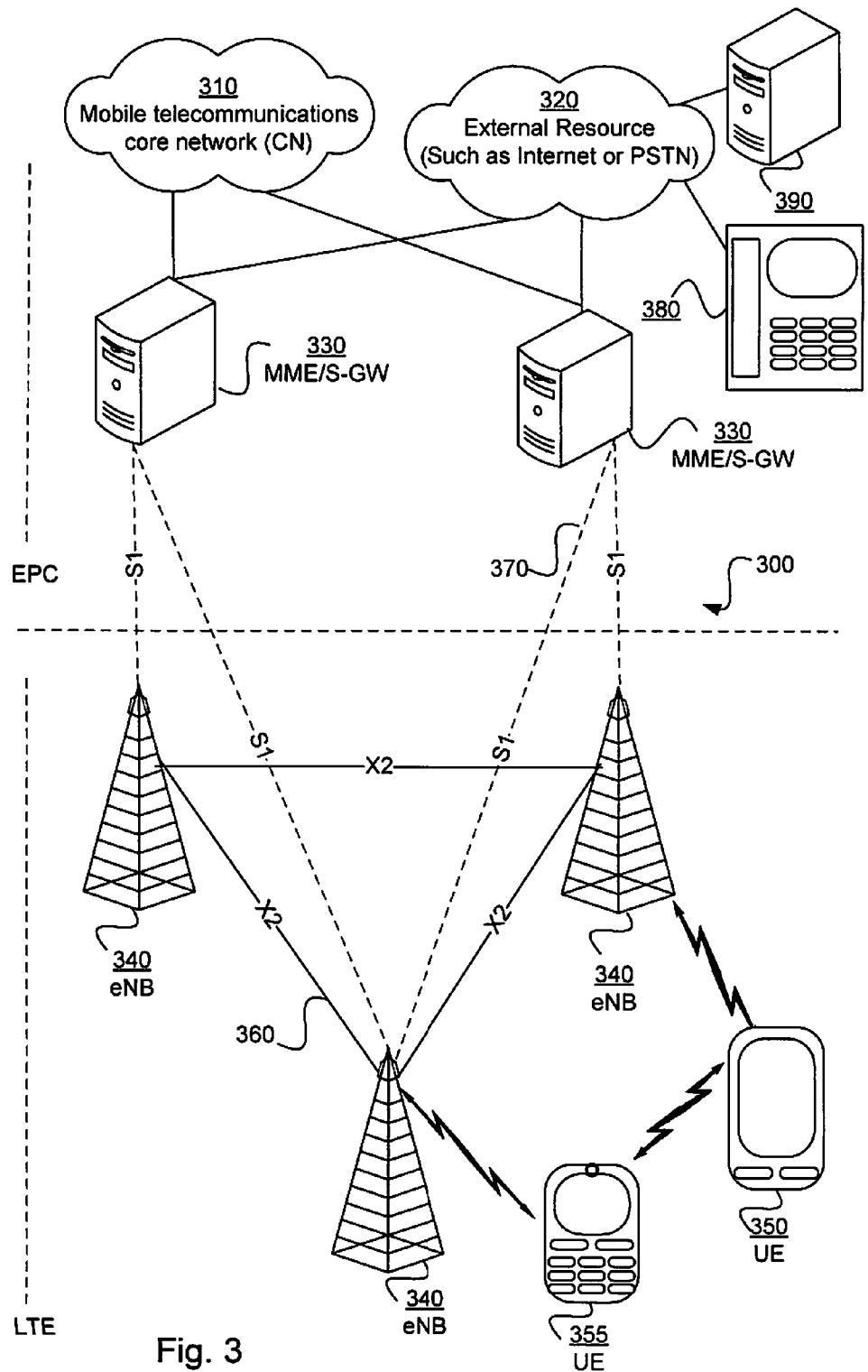
FIG. 3 shows a schematic view of a telecommunications system comprising a device according to one embodiment of the teachings of this application.

FIG. 3 shows a schematic view of the general structure of a telecommunications system 300 according to the teachings herein. In the telecommunication system of FIG. 3, various telecommunications services such as cellular voice calls, www/wap browsing, cellular video calls, data calls, facsimile transmissions, music transmissions, still image transmissions, video transmissions, electronic message transmissions and electronic commerce may be performed between a device 100, 200, 350 (which in this embodiment is a UE, such as a laptop or a smartphone) according to the disclosed embodiments and other communications terminals, such as another or remote device 355 or a stationary telephone 380. The remote devices 355 are referred to as being remote in that they are not the same user equipment as the device 350 and the term remote is used to illustrate that the another device 355 is (most often) remotely located from the device 350. The devices 350, 355 are connected to a mobile telecommunications core network 310 through Radio Frequency links via base stations 340.

The telecommunications system 300 comprises at least one server 330. A server 330 has a data storage and a controller that may be implemented by any commercially available CPU ("Central Processing Unit"), DSP ("Digital Signal Processor") or any other electronic programmable logic device. In one embodiment such a server is a Mobility Management Entity (MME). In one embodiment such a server is a Gateway (GW). The servers 330 are configured to communicate with a mobile telecommunications core network (CN) 310 and/or an external resource 320 such as the internet or a Public Switched Telephone Network (PSTN). A PSTN 320 is configured to communicate with and establish communication between stationary or portable telephones 380. In one embodiment the external resource comprises or is configured to communicate with an external service provider 390. In one embodiment the servers 330 are configured to communicate with other communications terminals using a packet switched technology or protocol. In such an embodiment the servers 330 may make up an Evolved Packet Core (EPC) layer.

The servers 330 are configured to communicate with nodes, also referred to as base stations 340. In one embodiment the base station 340 is an evolved Node Base (eNB). A base station 340 is further configured to communicate with a server 330. In one embodiment the communication between a server 330 and a base station 340 is effected through a standard or protocol 370. In one embodiment the protocol is SI. A base station 340 is configured to communicate with another base station 340. In one embodiment the communication between a base station 340 and another base station 340 is effected through a standard or protocol 360. In one embodiment the protocol 360 is X2. A base station 340 is further configured to handle or service a cell. In one embodiment the at least one base stations 340 make up a Long Term Evolution (LTE) layer. In one embodiment the at least one base stations 340 make up an LTE Advanced layer.

In one embodiment the base station 340 is configured to communicate with a device 350 (100) through a wireless radio frequency protocol.

In one embodiment the telecommunications system 300 is an Evolved Packet System (EPS) network. In one embodiment the telecommunications system is a system based on the 3GPP (3rd Generation Partnership Project) standard. In one embodiment the telecommunications system is a system based on the UMTS (Universal Mobile Telecommunications System) standard. In one embodiment the telecommunications system is a system based on a telecommunications standard such as GSM, D-AMPS, CDMA2000, FOMA or TD-SCDMA.

As shown in FIG. 3 one device 350 is also arranged to communicate directly with a second or remote device 355. This is indicated in FIG. 3 with the communication arrow between the device 350 and the remote device 355. By enabling one device 350 to communicate directly with a remote device 355 a more efficient use is made of the available bandwidth and it also enables a faster upload/download of various content, such as media files, as the communication does not have to be relayed by a base station. This reduces the resources required by the bases station and also may cut the bandwidth needed for sharing of the content. In addition, it enables services running on the devices to detect proximity of each other; e.g., a service running on one device 350 will become aware that the remote device 355 is within direct communication range, and depending on what services are running on the remote device 355 this may provide important information to the services running on the device 350. As one example, a social service running on the device 350 associated with a user of the device 355 may detect that the same social service associated with another user of the device 355 is running on the device 355 which is within direct communication range, hence nearby.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 4:
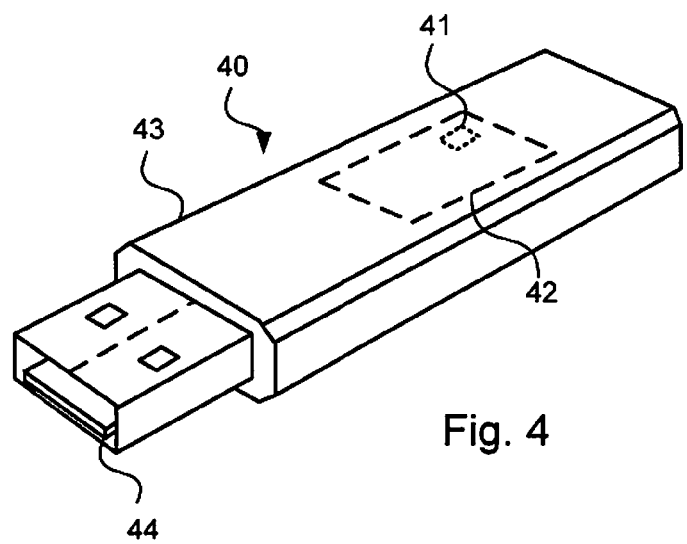
FIG. 4 shows a schematic view of a computer-readable medium according to one embodiment of the teachings of this application.

FIG. 4 shows a schematic view of a computer-readable storage medium as described in the above. The computer-readable medium 40 is in this embodiment a memory stick, such as a Universal Serial Bus (USB) stick. The USB stick 40 comprises a housing 43 having an interface, such as a connector 44, and a memory chip 42. The memory chip 42 is a flash memory, that is, a non-volatile data storage that can be electrically erased and re-programmed. The memory chip 42 is programmed with instructions 41 that when loaded (possibly via the interface 44) into a controller, such as a processor, executes a method or procedure according to the embodiments disclosed above. The USB stick is arranged to be connected to and read by a reading device, such as a terminal according to FIG. 1, for loading the instructions into the controller. It should be noted that a computer-readable medium can also be other mediums such as compact discs, digital video discs, hard drives or other memory technologies commonly used. The instructions can also be downloaded from the computer-readable medium via a wireless interface to be loaded into the controller.

Figure 5:
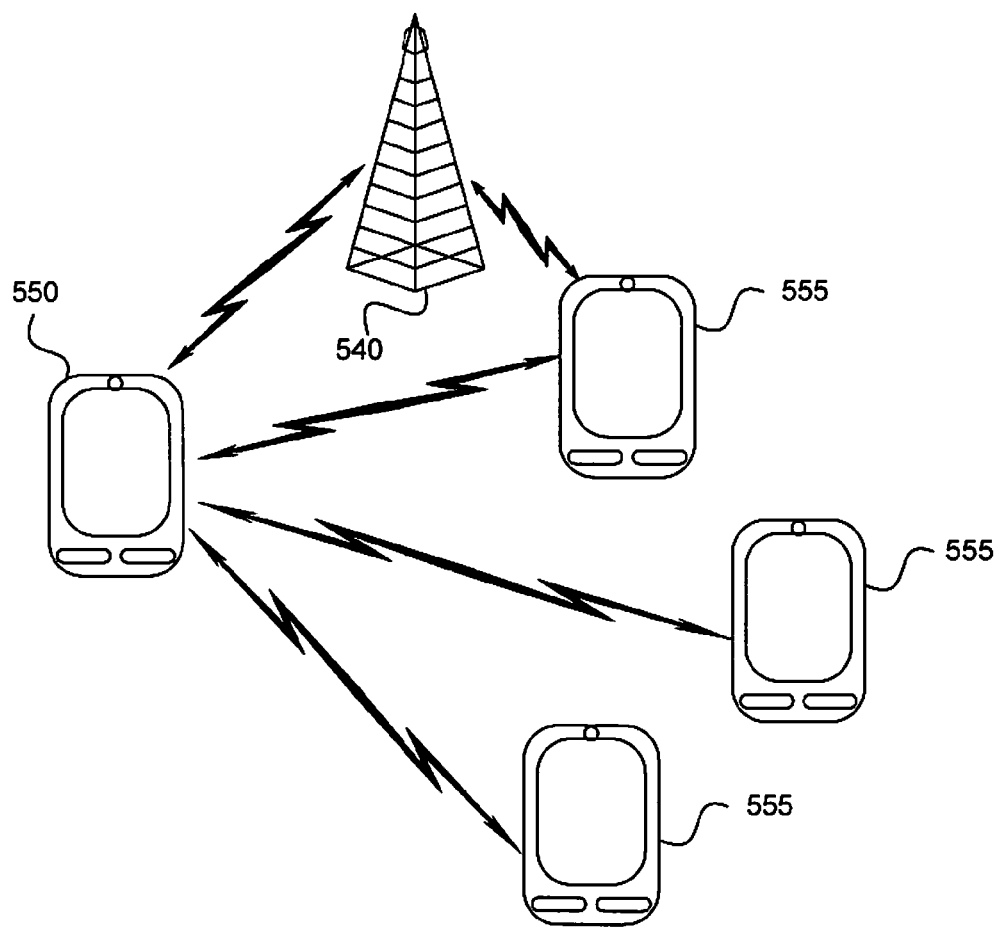
FIG. 5 shows a schematic view of a device-to-device communication system in which a device arranged to communicate with remote devices according to an embodiment of the teachings of this application.

FIG. 5 shows a schematic view of a device-to-device communication system (D2D communication system) in which a device 550 arranged to communicate with remote devices 555 according to an embodiment of the teachings of this application. In the embodiment shown in FIG. 5 there are 3 remote devices 555. It should be apparent that anyone device may be a device or a remote device depending on its current operation. It should also be noted that the number of devices 550 and remote devices 555 is not in any way limited to the numbers of this example embodiment. In one embodiment the device 550 is the device 100, 200 and 350 of FIGS. 1, 2 and 3.

The notation of a device 550 and a remote device 555 in FIG. 5 only relates to focussing on the device 550 currently being described with regards to its functionality.

The D2D communication system 550 further comprises a base station 540. In one embodiment the base station 540 is the base station or eNB 340 of FIG. 3. It should be noted that the number of base stations 540 may vary and depend on the current communications network. The device-to-device communication system of FIG. 5 may be comprised in a communications system 300 as shown in FIG. 3 where the device 550 corresponds to the device 350 in FIG. 3, the remote device 555 corresponds to the remote device 355 and the base station 540 corresponds to the base station 340.

The device 550 is arranged to communicate directly with the remote device 555. This may be implemented using the LTE standard, but can also be implemented using other radio frequency communication standards. The device 550 is thus able to exchange data with a remote device 555 directly without having to route the data through a base station 540 as is known for contemporary D2D communication systems.

It should also be noted that the remote devices 555 may also communicate directly with one another even though this is not explicitly shown in FIG. 5. Further, all remote devices 555 may also be arranged to communicate with the base station 540 even though this is not explicitly shown in FIG. 5. Such possibly communication paths have been omitted from FIG. 5 purely for illustrative clarity issues and for no other reason.

The data, which may comprise one or more expressions, that is to be exchanged between the device 550 and a remote device 555 may relate to a service that is offered by the remote device 555 to the device 550. Alternatively or additionally, the data that is to be exchanged between the device 550 and a remote device 555 may relate to a service that is offered by the device 550 to the remote device 555.

The data that is related to such a service is transmitted between a device 550 and a remote device 555 on a channel (referenced 600 in FIG. 6 and in the description below) through a radio frequency interface (not shown in FIG. 5, but referenced 230 in FIG. 2).

To enable the device 550 and the remote devices 555 and, hence, services running on said devices, to communicate, the device 550 and the remote devices 555 are arranged to implement an identification procedure commonly referred to as discovery where the services running on each device 550 and remote devices 555 announce themselves by making the devices sending an identification also referred to as an expression. In addition to an identification number an expression may also comprise information on a user, a geographical location, a contextual position, an application and also other features and factors. In one embodiment the identification number relates to such features and factors.

The device 550 is thus arranged to identify its services to services running on remote devices 555 by transmitting data in the form of a so-called expression over a channel enabling the remote devices 555 and services running on said devices 555 to discover the services running on the device 550. The device 550 is also thus arranged to discover services running on remote devices 555 by receiving such an expression over the channel.

FIG. 6A shows a schematic time view of transmitted data possibly comprising expressions in a channel 600. As can be seen in FIG. 6A the channel 600 is currently transmitting or propagating data, possibly comprising expressions, relating to a number of services. Each service may be categorized or grouped according to its service type. Examples of service types are social services, such as Facebook™ or Google+™ to name a few, commercial services, such as announcements from restaurants, petrol stations and shops to name a few, transportation services, such as bus services, taxi services, train services, traffic announcements and flight schedules to name a few, office services, such as printer status information or meeting room availability to name a few, to name a few service types. The service types may also be sub divided into sub categories or types. For example, the transportation service type may be subdivided into a bus transport type, a taxi transport type and a traffic announcement type.

Each service type may also be sub divided into sub types according to functionality. For example, the transportation service type may be subdivided into an arrival information service type or an availability service type to name a few examples.

In the example of FIG. 6A expressions relating to six (6) different services are being transmitted. The six expressions relate to four (4) different service types. Each expression is denoted SERVICEX:Y and separated with a ";" in FIG. 6A, where X indicates the service type (given by a number in FIGS. 6A-6E) and Y indicates the particular service (given by a number in FIGS. 6A-6E) within the service type. As can be seen the expressions are transmitted in an order that is indifferent to the service type. This requires that a device 550 is required to listen continuously to the channel 600 to ensure that no expressions are lost or missed. This is required irrespective of how many services the device 550 subscribes to or is interested in.

To allow a device 550 to save power (either reduce the power consumption of the device 550 itself or in a remote device 555) the device 550 is configured to transmit and/or listen to the channel according to a service scheduling. Using a service scheduling the device 550 is enabled to determine when to listen to the channel 600 to receive data, possibly comprising expressions comprising identification numbers, relating to a service of interest. This enables the device 550 to activate the radio interface (230) at specific times and deactivate it at other times (when services not of interest are scheduled according to a service scheduling) which will potentially reduce the power used by the radio interface (230) significantly.

To enable the device 550 to determine exactly when to listen the service scheduling is arranged so that the available bandwidth is arranged according to service type.

In one embodiment the service scheduling is arranged so that each service type is associated with one or more time slots (or a partial time slot). This service scheduling arranges the transmission of expressions so that the expressions are sent in pre-specified time slots according to their service types. In one example embodiment utilizing the radio access technology OFDM (Orthogonal frequency-division multiplexing) each service type is associated with one or more OFDM symbols.

FIG. 6B shows a schematic time view of the available time arranged in timeslots according to a service scheduling based on a service type for the services. The channel 600 in FIG. 6B is divided into four (4) time slots each associated with one service type (denoted SERVICEX in FIG. 6B). As can be seen all expressions for services belonging to service type number 1 is transmitted first, followed by expressions for services belonging to service type number 2 and so on.

In one embodiment the service scheduling is cyclic so that when all timeslots for relevant service types has passed the service scheduling restarts. In the example of FIG. 6B the expressions for services belonging to service type number 1 are transmitted after expressions for services belonging to service type number 4 have been transmitted.

It should be noted that the time slots in FIGS. 6B to 6E are shown as having no particular size whereas in some embodiments the time slots 610 may be of a fixed length or size and that in such embodiments each service type is associated with a number of time slots 610 (or partial time slots).

FIG. 6C shows a schematic time view of the arrangement of FIG. 6B with example traffic where it can be seen that expressions for the "first" service belonging to service type number 1 is transmitted first, followed by expressions for service type 2 and service type 3 after which expressions for the "first" service belonging to service type number 4 is transmitted. This is followed by transmitting expressions for the "second" service belonging to service type number 1 is transmitted first, followed by expressions for service type 2 and service type 3 after which expressions for the "second" service belonging to service type number 4 is transmitted.

The device 550 is thus only required to listen to the channel 600 during specific time slots 610 and is thus able to reduce the power needed to run the radio interface (230). Furthermore, controller clock cycles are freed up during the time slots 610 in which no listening is required which further improves the performance of the device 550.

To enable all devices 550 and remote devices 555 to perform their listening and transmissions according to a service scheduling the base station 540 is configured to arrange the service scheduling according to the service types by assigning at least one (partial) time slot 610 to each service type or to a select group of service types and to transmit information on the service scheduling to the device 550 and the remote devices 555. The device 550 is thus configured to receive a message from the base station 540, wherein the message carries information on the timing particulars of the service scheduling, and to configure the listening to the channel 600 via the radio interface (230) according to which service types that are of interest to the device 550 for receiving expressions relevant for those service types. The device 550 is thereby also enabled to configure the transmission of expressions over the channel 600 via the radio interface (230) according to which service types that are offered by the device 550.

The base station 540 may be configured to receive indications on which services that are offered by a device 550, 555 as the device registers with the base station 540. This enables the base station 540 to know which service types that are offered by the device 550 and the remote devices 555 and enables a more efficient arrangement of the service scheduling in that service types that no device 550, 555 offer services in do not need to assigned a (partial) time slot 610.

The service scheduling can thus be arranged for all available service types or a select group of service type, which select group of service types includes the service types of the services offered by the device 550 and the remote devices 555 in a telecommunications network cell (not explicitly shown in FIG. 5) that is handled by the base station 540.

In one embodiment the service scheduling may be static and arranged according to known service types and possibly the amount of services in each service type. A static service scheduling allows devices 550 to easily tune in to the channel at the correct time slot 610.

By configuring the base station 540 to arrange the service scheduling, the service scheduling may be arranged effectively without the necessity of implementing time and bandwidth consuming voting schemes among the devices 550 and the remote devices 555. Especially since the device 550 and the remote devices 555 will communicate with the base station 540 as they enter or are registered in the telecommunication network cell.

As can be seen in FIG. 6C some expressions (SERVICE 2 and SERVICE 3) are sent more than others (SERVICE 1 and SERVICE 4). This repeat of the expressions consumes bandwidth and it also leads to that it will take some additional time to discover some services (as a device 550 is required to listen for many cycles to receive all expressions associated with a service type).

To reduce the time needed to receive each expression the service scheduling may be arranged based on the number of services in a service type. Additionally and/or alternatively, the service scheduling may be arranged based on the amount of traffic that is to be transmitted for each service type. FIG. 6D shows a schematic time view of a service scheduling where the available time is arranged in timeslots 610 based on the amount of traffic/number of operators in a service type.

In such an embodiment the base station 540 is configured to receive notifications or indications on the number of services in each service type and a projected or real amount of data traffic to be transmitted for each particular service (or service type) from the device 550 and/or the remote devices 550 and to arrange the service scheduling accordingly.

In one embodiment the base station 540 is configured to listen to the channel 600 and to determine the amount of traffic for each service type and/or the number of services in each service type and to arrange the service scheduling accordingly.

This further allows for a dynamic arrangement of the service scheduling which allows for adapting according to services run on devices entering or leaving the telecommunication network cell or area and also for adapting according to changes in a user's usage of a device 550, 555.

In FIG. 6D it can be seen that the service scheduling according to this example is arranged so that service types 1 and 4 are allocated twice the amount of time slots 610 that service types 2 and 3 have been allocated. This is based on that service type 1 and 4 comprise two particular services each, whereas service types 2 and 3 only comprise 1 particular service each.

A device 550 listening to the channel 600 is thus only required to listen for one cycle to receive all required expressions. This allows for a more efficient use of bandwidth.

As has been discussed with reference to FIG. 6C a device 550 may be required to listen for many cycles if it is subscribing to a service that belongs to a service type that has a lot of traffic. If the particular service or service type that the device 550 is subscribing to or trying to discover is important to the device 550, such extended listening time may be unacceptable. To reduce the listening time required for certain services or service types the service scheduling may be arranged according to a priority of a service. Services of special importance or that are time-sensitive can thus be allocated a larger amount of time slots 610 for enabling a faster discovery of the services. FIG. 6E shows a schematic time view of the available time arranged in time slots 610 based on a priority for a service type with example traffic.

As the service scheduling implies that certain data is sent at specific times, the device 550 and the remote devices 555 need to be synchronized. The synchronisation can be effected in different manners.

In one embodiment the device 550 is configured to listen to the channel 600 until a service type (or service) is identified and based on the time when the service type is identified the device 550 synchronizes itself to the service scheduling by correlating the time for the identified service type to the service scheduling.

In one embodiment the device 550 is configured to receive a synchronisation message from the remote device 555 instructing the device 550 to synchronize at a specific time to the service scheduling. The time is, in one embodiment, specific to a telecommunications network cell.

In one embodiment the device 550 is configured to transmit a synchronisation message to the remote device 555 instructing the remote device 555 to synchronize at a specific (possibly a telecommunication cell-specific) time to the service scheduling.

In one embodiment such messages form part of a handshaking protocol.

In one embodiment the device 550 is configured to receive a synchronisation message from the base station 540 instructing the device 550 to synchronize at a specific (possibly a telecommunication cell-specific) time to the service scheduling. In one such embodiment the base station 540 is configured to broadcast a synchronisation message. Additionally and/or alternatively the base station is configured to transmit synchronisation data to a device 550, 555 as the device registers with the base station 540.

In one embodiment the device 550 is configured to synchronize to the service scheduling through a Global Positioning System clock or other timing resource commonly user by or accessible to the device 550, the remote devices 555 and the base station 540.

Figures 7A, 7B, 7C:
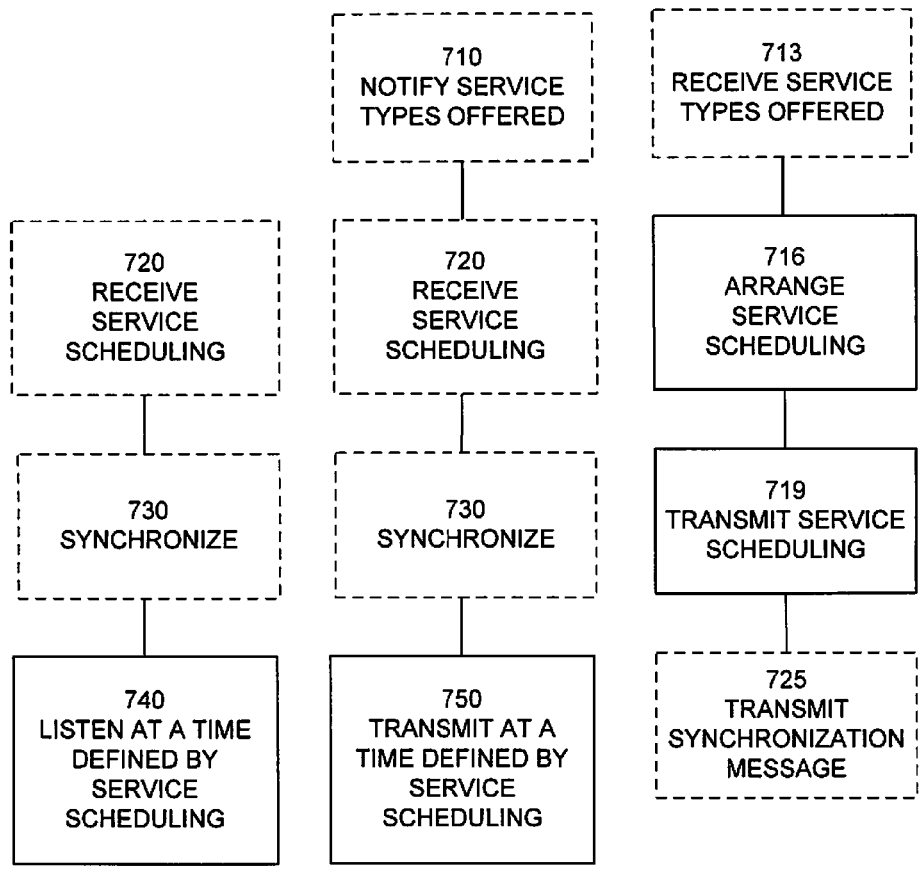
FIG. 7A shows a flow chart for a general method for a listening device according to an embodiment of the teachings of this application
FIG. 7B shows a flow chart for a general method for a transmitting device according to an embodiment of the teachings of this application.
FIG. 7C shows a flow chart for a general method for a base station according to an embodiment of the teachings of this application and FIG. 8 shows a schematic view of the general structure of a base station according to one embodiment of the teachings of this application.

FIG. 7A shows a flowchart of a general method for a device 550 trying to discover services running on remote devices 555 according to herein. The device 550 may receive a message in step 720 carrying information on a service scheduling which carries timing data for at least one service type. The device 550 may synchronize itself according to the service scheduling in step 730, possibly by receiving (in step 730) a synchronization message, and listens in step 740 to a channel (600) for receiving expressions to enable discovering one or more services running on one or more remote devices 555.

FIG. 7B shows a flowchart of a general method for a device 550 according to herein that is running services to be discovered by remote devices 555. The device 550 may notify a base station 540 in step 710 of the services and/or the service types that the device 550 offers. The device 550 may thereafter receive a message in step 720 carrying information on a service scheduling which carries timing data for at least one service type. The device 550 may synchronizes itself according to the service scheduling in step 730, possibly by receiving (in step 730) a synchronization message, and transmits an expression in step 750 via a channel (600) enabling one or more remote devices 555 to discover the services running on the device 550.

The device 550 implementing the flowchart of FIGS. 7A and/or FIG. 7B may thus be configured for receiving (720) a message from a base station (340, 540) via a radio interface (230) for adapting communication according to said service scheduling wherein said message includes information on the service types and associated time slots. The device 550 may further be configured for receiving (730) a synchronization message from a base station (340, 540) for synchronizing said service scheduling. And the device 550 may additionally and/or alternatively be configured for transmitting or receiving a synchronization message over said radio interface (230) to or from respectively a remote device (355, 555) for synchronizing said service scheduling.

FIG. 7C shows a flowchart of a general method for a base station 540 according to herein. The base station may receive notifications on services and services types that are offered by devices 550, 555 in step 713. The base station 540 thereafter arranges the time and/or bandwidth that is available in a service scheduling based on the service types in step 716. In one embodiment the base station 540 assigns one or more (partial) timeslots to a service type. The base station 540 transmits the service scheduling to at least one device 550, 555 in step 719. Optionally, the base station thereafter transmits a synchronization message to the devices 550, 555 in step 725.

The base station 540 implementing the flowchart of FIG. 7C is thus configured for assigning said at least one time slot to a service type according to an amount of services belonging to a service type.

The base station 540 is further configured for assigning said at least one time slot to a service type according to a priority of said service type. And, the base station 540 may also be configured for adapting the service scheduling dynamically according to a change in the amount of services in a service type and/or the amount of data traffic for one service type. In one embodiment the service scheduling is arranged to be static.

Additionally and/or alternatively the base station 540 is further configured for arranging said service scheduling by assigning at least one partial time slot to a service sub type, when the service type comprises service sub types.

Figure 8:
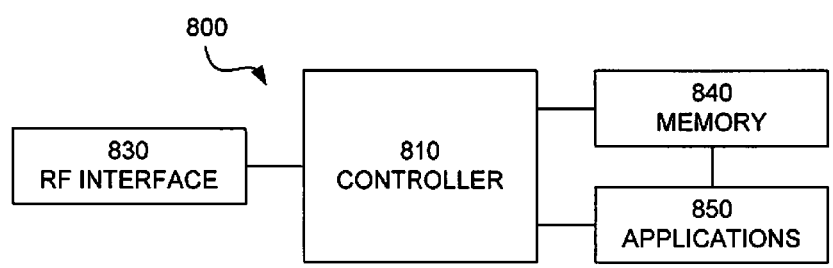

FIG. 8 illustrates an example of a base station 800 such as a base station 340 in FIG. 3 which may be an evolved Node Basestation (eNB). The base station 800 comprises a controller 810 which is responsible for the overall operation of the base station 800 and is preferably implemented by any commercially available CPU ("Central Processing Unit"), DSP ("Digital Signal Processor") or any other electronic programmable logic device. The controller 810 may be implemented using instructions that enable hardware functionality, for example, by using executable computer program instructions in a general-purpose or special-purpose processor that may be stored on a computer readable storage medium (disk, memory etc) 840 to be executed by such a processor. The controller 810 is configured to read instructions from the memory 840 and execute these instructions to control the operation of the base station 800. The memory 840 may be implemented using any commonly known technology for computer-readable memories such as ROM, RAM, SRAM, DRAM, CMOS, FLASH, DDR, EEPROM memory, flash memory, hard drive, optical storage or any combination thereof. The base station 800 further comprises one or more applications 850. The applications are set of instructions that when executed by the controller 810 control the operation of the base station 800. The memory 840 is used for various purposes by the controller 810, one of them being for storing applications data and program instructions.

The base station 800 further comprises a radio interface 830, which is adapted to allow the base station 800 to communicate with devices (referenced 550 in FIG. 5), remote devices (referenced 555 in FIG. 5), other base stations 800 (340 in FIG. 3) and a server (referenced 330 in FIG. 3) through, for example, a radio frequency band through the use of different radio frequency technologies. Examples of such technologies are W-CDMA, GSM, UTRAN, LTE, and NMT to name a few. Optionally, the base station 800 comprises a Bluetooth interface, a WiFi interface and/or an IrDA interface for local connectivity.

One benefit is that the manner taught herein reduces the power used by a device when forming part of a D2D communication network.

Another benefit is that clock cycles of the controller is freed up, thereby increasing the computational speed of a device.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method by a device, said device comprising:
 a memory configured to store one or more services and data associated with said one or more services;
 a controller configured for execution of one or more services; and
 a radio interface circuit for communicating with a remote device,
 said method comprising:
 receiving a synchronization message from a base station for synchronizing a service scheduling;
 listening according to the service scheduling to a channel via said radio interface circuit for discovering one or more services running on said remote device by receiving data associated with one or more of said one or more services, wherein said service scheduling is arranged according to at least one service type; and
 transmitting data associated with one or more of said one or more services according to a service scheduling over a channel via said radio interface circuit to enable said remote device to discover said one or more services running on said device, wherein said service scheduling is arranged according to the at least one service type,
 wherein said data associated with one or more of said one or more services comprises an expression comprising the service type and an identification of the one or more service running on said remote device.

2. The method according to claim 1, further comprising receiving a message from a base station for adapting communication according to said service scheduling wherein said message includes information on the service types and associated time slots.

3. The method according to claim 1, further comprising transmitting or receiving a synchronization message over said radio interface circuit to or from respectively a remote device for synchronizing said service scheduling.

4. A device comprising:
 a memory storing one or more services and data associated with said one or more services;
 a controller configured for execution of one or more services; and
 a radio interface circuit for communicating with a remote device,
 wherein said controller is further configured to receive a synchronization message from a base station via said radio interface for synchronizing said service scheduling, to listen to a channel via said radio interface circuit for discovering one or more services running on said remote device by receiving data associated with one or more of said one or more services, wherein said controller is configured to listen to said channel according to a service scheduling which is arranged according to at least one service type, and to transmit data associated with one or more of said one or more services according to the service scheduling said service data on said channel,
 wherein said data associated with one or more of said one or more services comprises an expression comprising the service type and an identification of the one or more service running on said remote device.

5. The device according to claim 4, wherein said controller is further configured to receive a message from a base station via said a radio interface circuit for adapting communication via said a radio interface circuit according to said service scheduling wherein said message includes information on the service types and associated time slots.

6. The device according to claim 4, wherein said controller is further configured to transmit or receive a synchronization message over said radio interface circuit to or from respectively said remote device for synchronizing said service scheduling.

* * * * *